United States Patent [19]
Tokumasu et al.

[11] Patent Number: 5,353,395
[45] Date of Patent: Oct. 4, 1994

[54] PATTERN PROCESSING METHOD

[75] Inventors: Shinji Tokumasu; Shiro Nonaka; Yasumasa Kawashima, all of Hitachi; Tomotoshi Ishida, Katsuta; Norihiro Nakajima, Hitachi; Misato Nio, Hitachi; Yoshio Kunitomo, Hitachi; Kenichi Anjyo, Hitachiohta, all of Japan

[73] Assignee: Hitachi, Ltd., Tokyo, Japan

[21] Appl. No.: 956,964

[22] Filed: Oct. 6, 1992

Related U.S. Application Data

[63] Continuation of Ser. No. 801,606, Dec. 5, 1991, abandoned, which is a continuation of Ser. No. 460,092, Jan. 29, 1990, abandoned.

[51] Int. Cl.$^5$ ............................................. G06F 15/20
[52] U.S. Cl. ...................................................... 395/141
[58] Field of Search ............... 395/118, 127, 128, 129, 395/140, 142, 141, 143; 340/747, 750; 345/133, 134, 142, 143

[56] References Cited

U.S. PATENT DOCUMENTS 5,113,486  5/1992  Luttmer ............................... 395/106
5,197,120  3/1993  Saxton et al. ....................... 395/139

*Primary Examiner*—Phu K. Nguyen
*Attorney, Agent, or Firm*—Antonelli, Terry, Stout & Kraus

[57] ABSTRACT

A pattern processing method is provided which performs the following steps with regard to a region in an n-dimensional space: providing a procedure (relative expression procedure) for generating relative positional data of any desired point in the n-dimensional space with respect to the region by the use of a series of data determining the region (the relative positional data including data indicating whether the point is inside or outside the region, the distance from the point to the boundary of the region, etc.), thereby identifying the region with the procedure, and thus unitarily determining the region; generating a relative expression procedure for a new region from the relative expression procedure(s) of one or more regions given the procedures, the relative expression procedure for the new region being obtained by configurationally processing and editing the one or more relatively expressed regions, thereby relatively expressing the new region; and expressing configurational characteristics of each relatively expressed region itself by the use of the relative expression procedure of the region. Thus, the processing of patterns in an n-dimenaional space can be unitarily effected on the basis of the one and only concept, that is, the relative expression procedures, without deponding upon the configuration of each particular region as being an object of processing so that the pattern processing method itself is simplified.

12 Claims, 12 Drawing Sheets

FIG. 3(a)

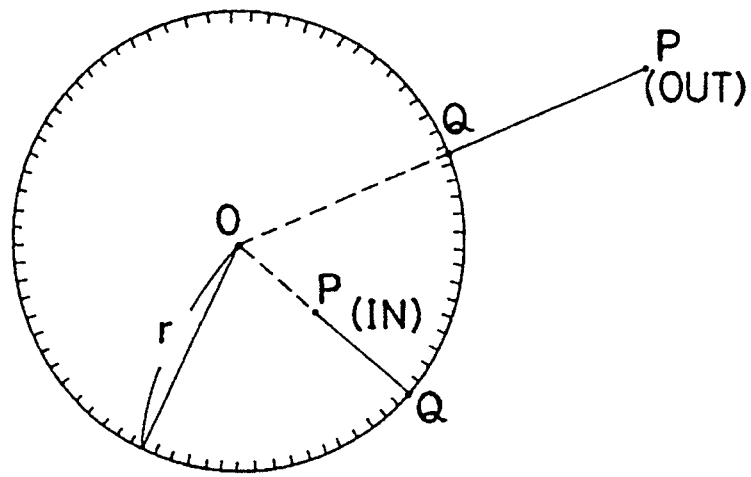

FIG. 3(b)

(300) PROCEDURE FOR RELATIVE EXPRESSION OF DISK REGION WHOSE RADIUS IS r (310) SHORTEST DISTANCE  $\rho$ = LENGTH $\overline{OP}$ OF OP − RADIUS r (320) SIGN JUDGEMENT OF $\rho$  $\rho > 0$ / $\rho \leq 0$ (330) INSIDE/OUTSIDE JUDGEMENT = OUT (340) INSIDE/OUTSIDE JUDGEMENT = IN  $\rho = -\rho$ (350) UPPER BOUND $\rho^+ = \rho$
LOWER BOUND $\rho^- = \rho$ (360) BOUNDARY POINT Q = r × VECTOR $\overline{OP}/\overline{OP}$ (370) RELATIVE POSITIONAL DATA = (INSIDE/OUTSIDE JUDGEMENT, $\rho^+, \rho^-, Q$)

FIG. 4(a)
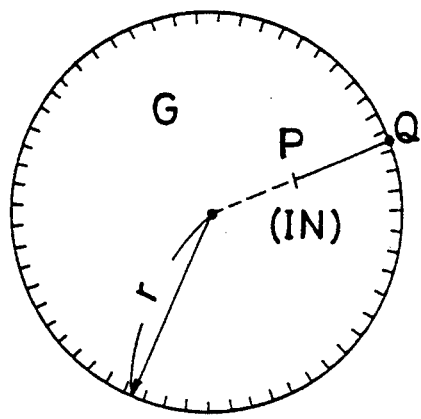
FIG. 4(b)
INVERTED (G)
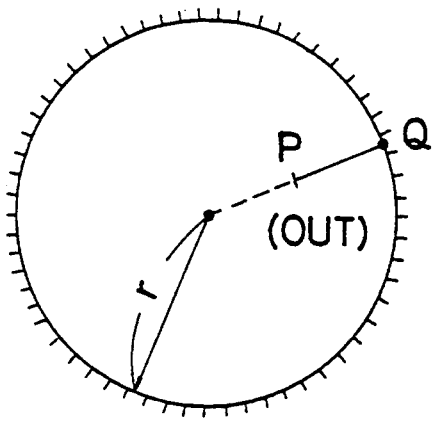
FIG. 4(c)
(400) RELATIVE EXPRESSION PROCEDURE FOR INVERTED (G)
(410) RELATIVE EXPRESSION PROCEDURE FOR REGION G
  INSIDE/OUTSIDE JUDGEMENT, $\rho^+, \rho^-, Q$
(420) INVERT INSIDE/OUTSIDE JUDGEMENT
  OUT TO IN
  IN TO OUT
(430) RELATIVE POSITIONAL DATA
  = (INSIDE/OUTSIDE JUDGEMENT, $\rho^+, \rho^-, Q$)

PATTERN PROCESSING METHOD

This is a continuation of application Ser. No. 07/801,606, filed Dec. 5, 1991, now abandoned which is a continuation of application Ser. No. 07/460,092, filed Jan. 29, 1990, now abandoned.

TECHNICAL FIELD

The present invention relates to a pattern processing method for computer-aided design or computer graphics. More particularly, the present invention pertains to a pattern processing method which is suitable for use in the generation of pictures, the process of design, machine design, production design, etc.

BACKGROUND ART

As prior arts concerning pattern processing methods for computer-aided design or computer graphics, there have been proposed various methods concerning definition, processing, editing, display, etc., of two- or three-dimensional regions. In regard to the method of processing three-dimensional solids, which is the subject matter of the present invention, the following three typical techniques are known:

(1) Boundary Representation (hereinafter abbreviated as "B-rep method")

This method was proposed by Braid. According to the method, the configuration of each three-dimensional region is structurally expressed by a combination of topological and geometrical data concerning surfaces, edges and vertexes, thus enabling a set operation between regions on the basis of these data. As a literature making mention of the B-rep method, an article entered in Computer Aided Design of Mechanical Components with Volume Building Bricks, Proc. 2nd Int. IFIP/IFAC Conference, Budapest, PP174, 1973 is known.

(2) Constructive Solid Geometry (hereinafter abbreviated as "CSG method")

This method was proposed by Prof. Norio Okino. The method is based on the assumption that a desired region is constructively formed from basic regions, for example, a cube, sphere, circular cylinder, etc. by performing a set operation, and a desired region is expressed by showing the process of a set operation with a tree structure. This method needs special techniques for calculating characteristic quantities of the resulting region and displaying the configuration of the region. As a literature concerning the CSG method, an article entered in TIPS-1; Technical Information Processing System for Computer Aided Design, Drawing and Manufacturing, Proc. 2nd Int. IFIP/IFAC, P-RORAMAT Conference, Budapest, PP141, 1973 is known.

(3) Octree Method

This method was proposed by Hunter. In this method, the principle of the quadtree method that hardles two-dimensional regions is applied to three-dimensional ones. According to the quadtree method and the octree method, regions are expressed in the form of quadtrees and octrees, respectively. As literature concerning the quadtree method, there the specification of U.S. Pat. No. 3,062,702 (Aug. 3, 1981) to Warnock. As a literature concerning the octree method, there is a thesis submitted to the Electronics & Computer Science Department of Princeton University, entitled "Effective Computer Utilization and Data Structure For Graphics".

The following four points are important to a pattern processing method for computer-aided design or computer graphics, although the weight somewhat differs depending upon each particular purpose:

(I) It must be possible to define, process, edit and display regions varying in configuration over a wide range and also output characteristic values of each region.

(II) It must be possible to ensure processing results which are effective to any possible combination of data. In other words, the pattern processing method must be solid.

(III) Regarding the above (II), it must be possible to ensure processing precision required for each particular purpose.

(IV) The pattern processing method and the format of configurational data concerned therewith must be simple, and the amount of data must be small.

The B-rep method that is one of the above-described prior arts is satisfactory in regard to the above-described point (I) but incomplete in regard to the above-described point (II) and has many problems in regard to the other points (III) and (IV). The CSG method has a problem in regard to the above-described (I) since there is a restriction on the number of kinds of configuration of regions which can be handled. The octree method is, in principle, superior to the other methods in regard to all the points. However, in regard to the above-described point (III ), for example, if it is intended to prepare information concerning machining a mechanical product which needs to ensure practical tolerances, the amount of data required therefor is so large that it exceeds the limit of the range within which data can be handled in practical use, thus causing a problem in regard to the above-described point (IV).

As has been described above, any of the prior art methods has the problems that it cannot be applied to a wide range of applications and it is insufficient to function as a pattern processing method which is solid, clear and simple.

It is an object of the present invention to provide a pattern processing method which has solved the above-described problems of the prior arts and enables simplication of the processing system and a reduction in the amount of data necessary to handle, thus meeting all the above -described requirements (1) to (4).

DISCLOSURE OF INVENTION

The present invention provides a pattern processing method comprising, in regard to a region in an n-dimensional space (n=a natural number):

(1) means for providing a procedure (hereinafter referred to as "relative expression procedure") for generating relative positional data of any desired point P in the space with respect to the region in a fixed format by the use of a series of data determining the region, thereby identifying the region with the procedure, and thus unitarily determining the region;

(2) means for generating a relative expression procedure for a new region from the relative expression procedure(s) of one or more regions given the procedures (hereinafter referred to as "relatively expressed region(s)"), the relative expression procedure for the new region being obtained by configurationally processing and editing the one or more relatively expressed regions, thereby relatively expressing the new region; and (3) means for expressing configurational characteristics of each relatively expressed region itself by the use of the relative expression procedure of the region.

BRIEF DESCRIPTION OF DRAWINGS

FIGS. 2 to 12 are views employed to explain the pattern processing method according to the present invention, in which:

FIGS. 3(a) and 3(b) are views for explaining an operation of defining a basic region;

FIGS. 4(a) to 4(c) are views for explaining an inverting operation;

FIG. 8 is a view for explaining a reflection transformation;

FIGS. 9(a) and 9(b1) to 9(b4) are views for explaining an offset operation;

FIGS. 11(a) and 11(b1) and 11(b2) are views for explaining a method of expressing an outline of a region; and FIGS. 12(a1), 12(a2) and 12(b) are views for explaining a method of displaying a region.

BEST MODE FOR CARRYING OUT THE INVENTION

Embodiment 1

One embodiment of the pattern processing method according to the present invention will be described below in detail with reference to the drawings.

Figure 1:
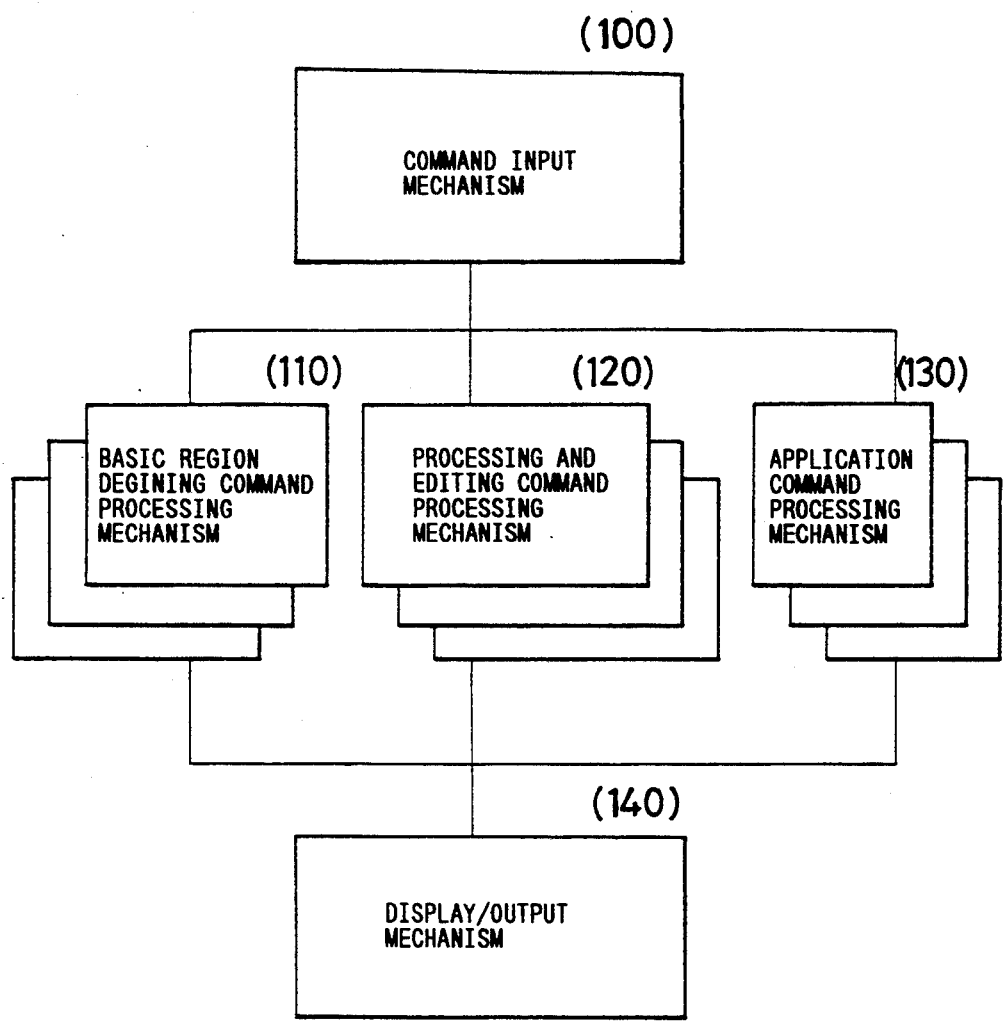
FIG. 1 is a block diagram showing the arrangement of a pattern processing apparatus for carrying out the method according to one embodiment of the present invention.
Figure 6A:
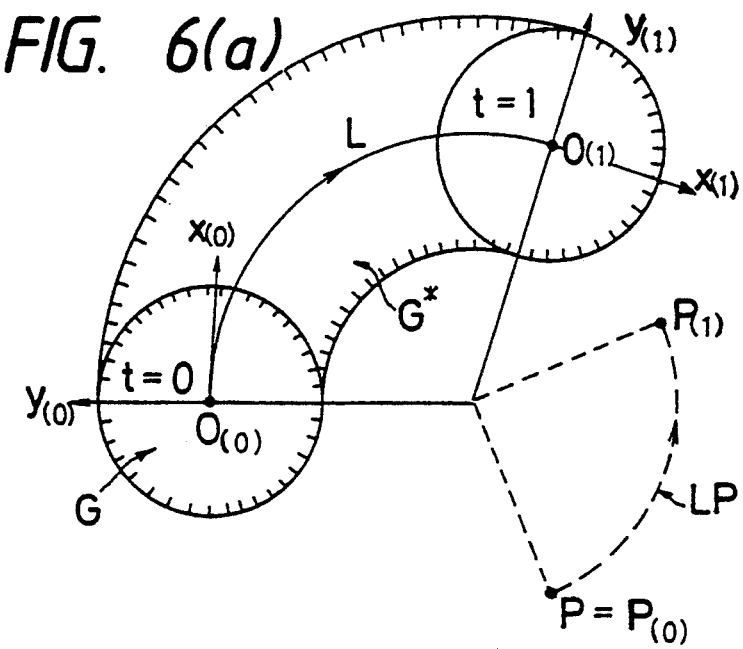
FIGS. 6(a) to 6(c) are views for explaining a movement operation.
Figure 6B:
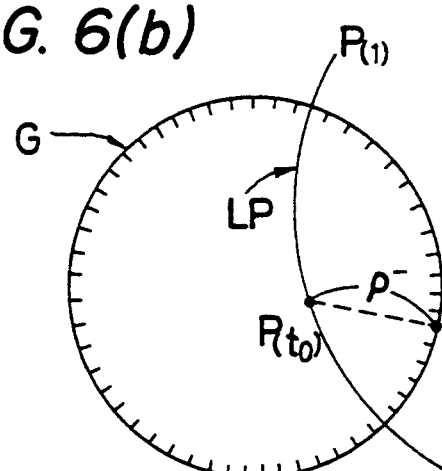
Figure 6C:
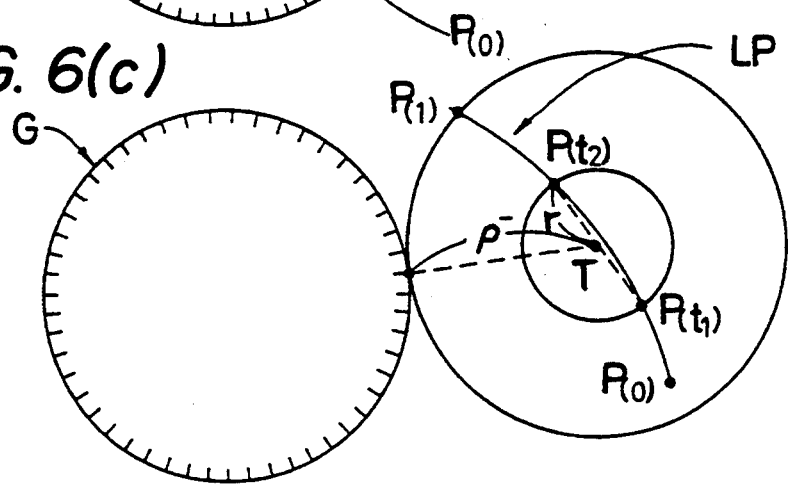
Figure 7A:
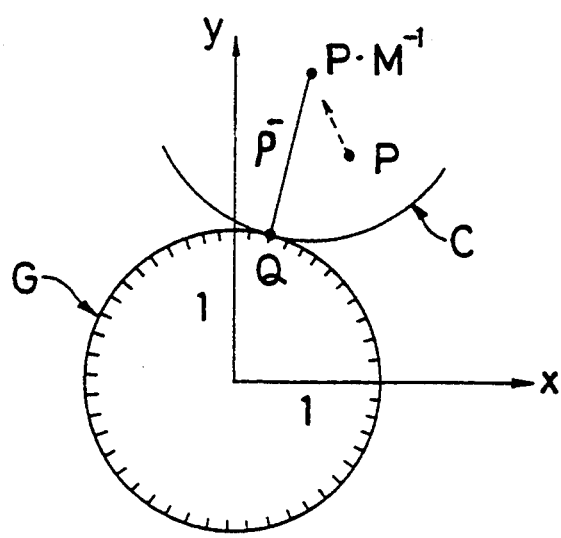
FIGS. 7(a) to 7(b) are views for explaining an affine transformation.
Figure 7B:
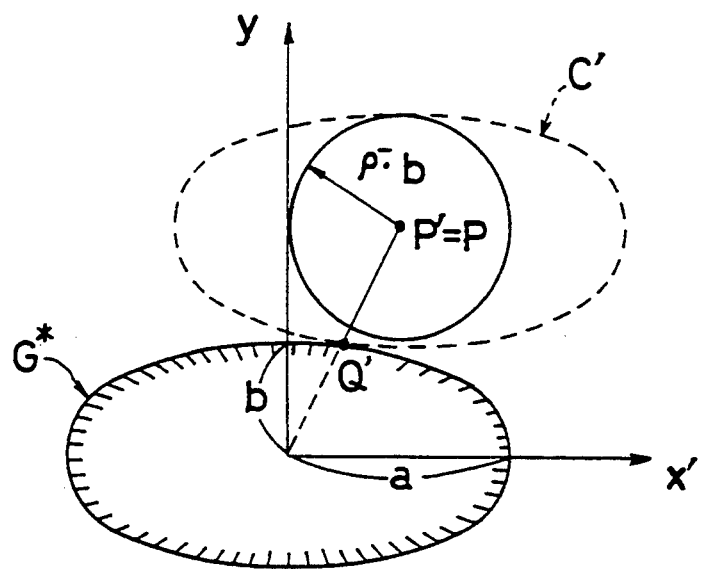
Figure 8:
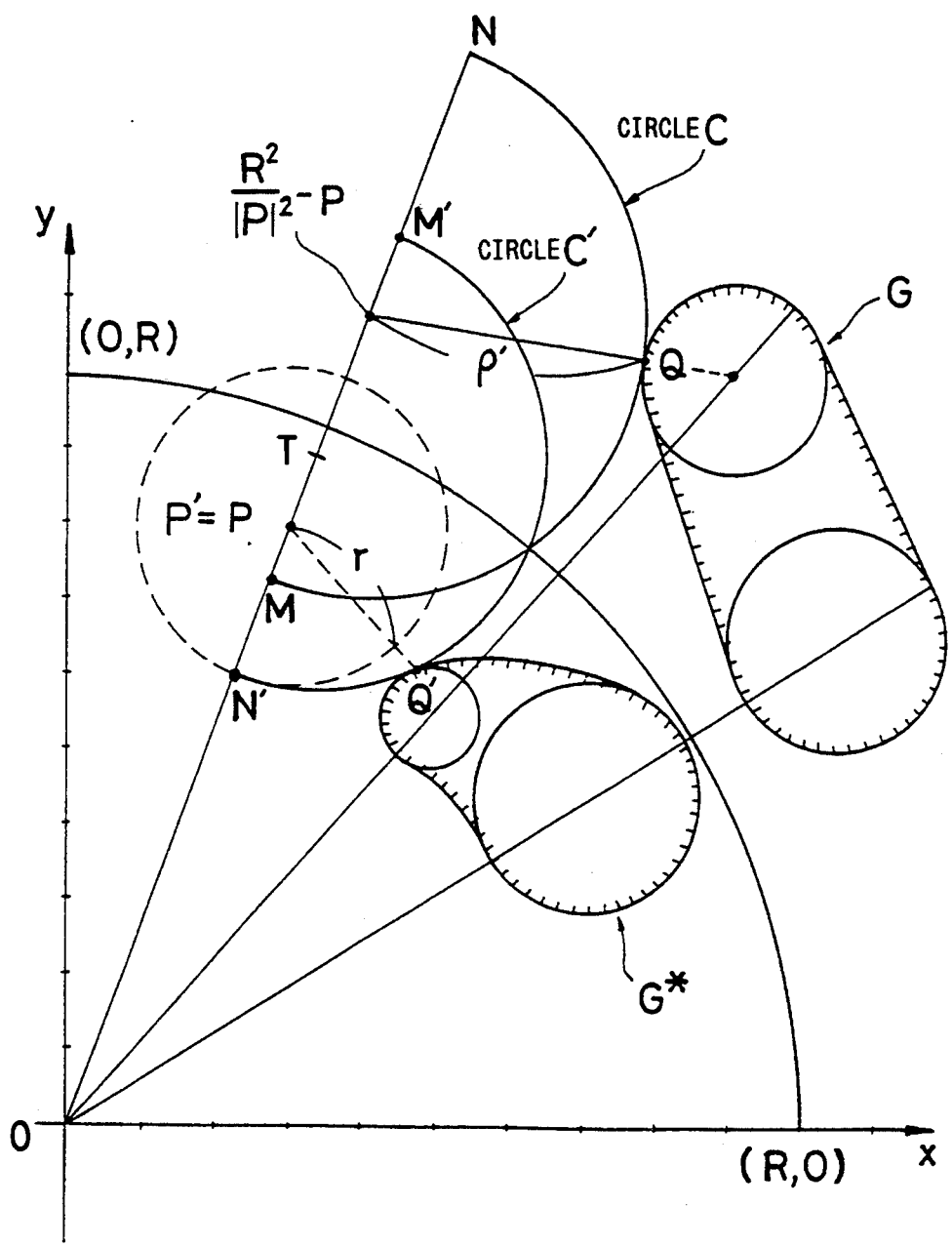
Figure 9A:
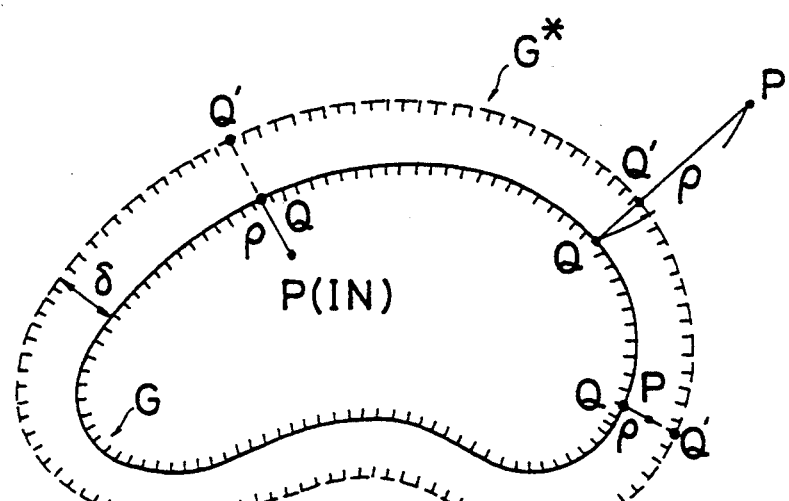
Figure 9:
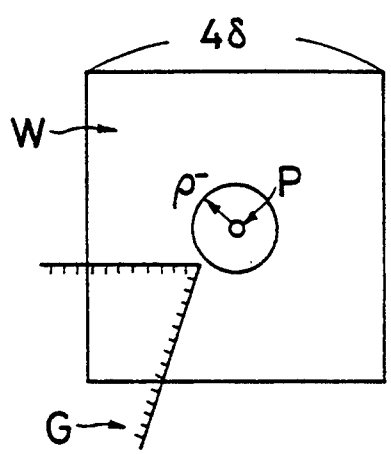
Figure 9:
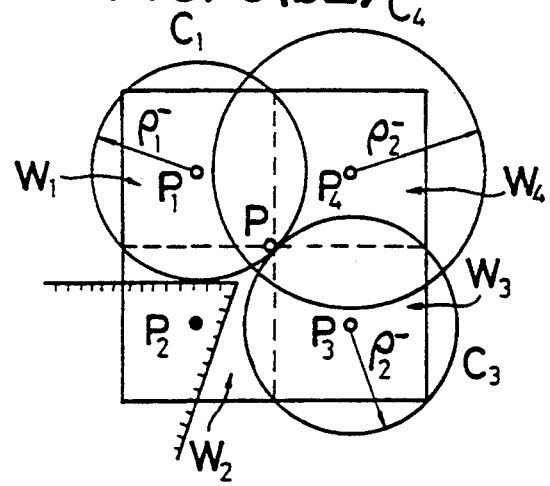
Figure 9:
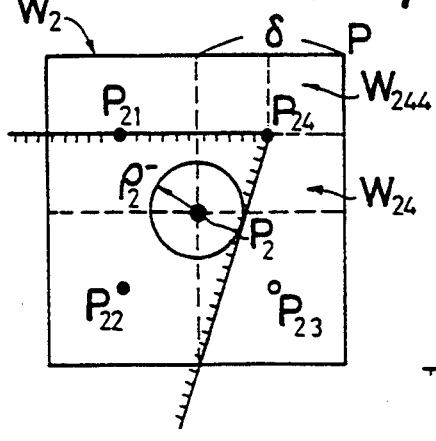
Figure 9:
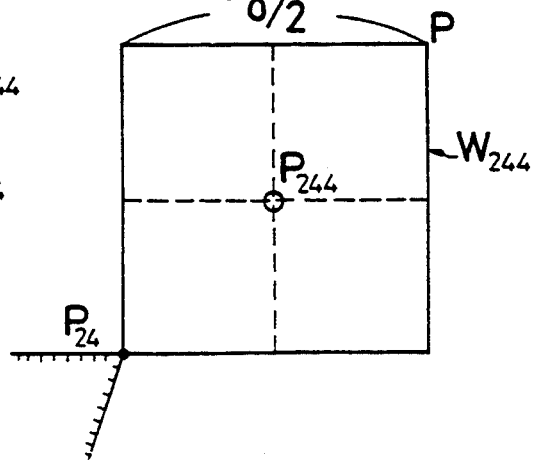
Figure 10A:
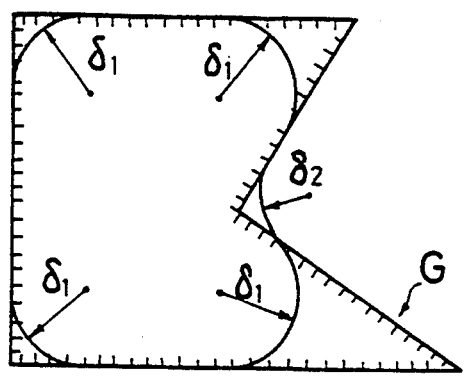
FIGS. 10(a) to 10(c) are views for explaining a filleting operation.
Figure 10B:
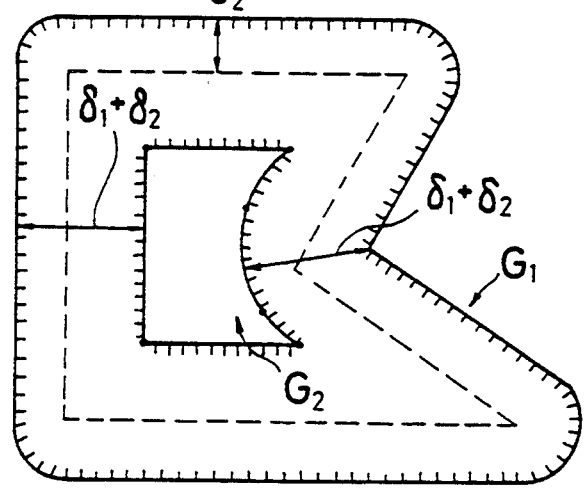
Figure 10C:
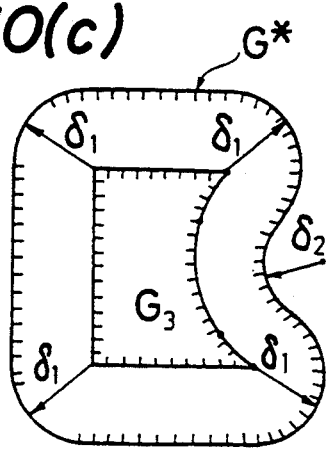
Figure 11A:
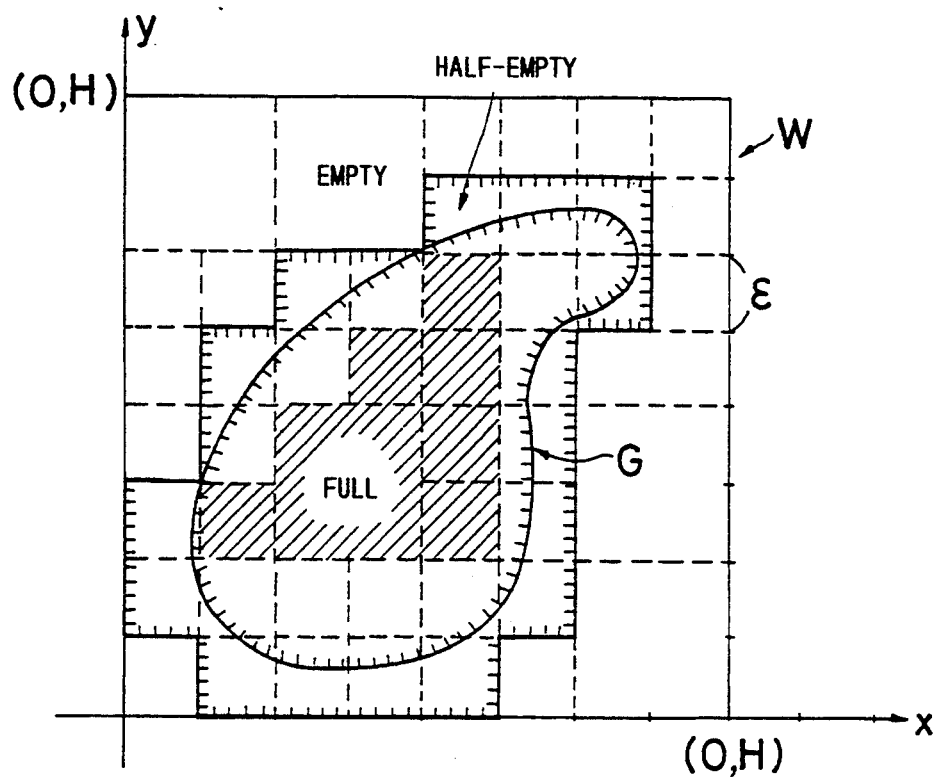
Figure 11:
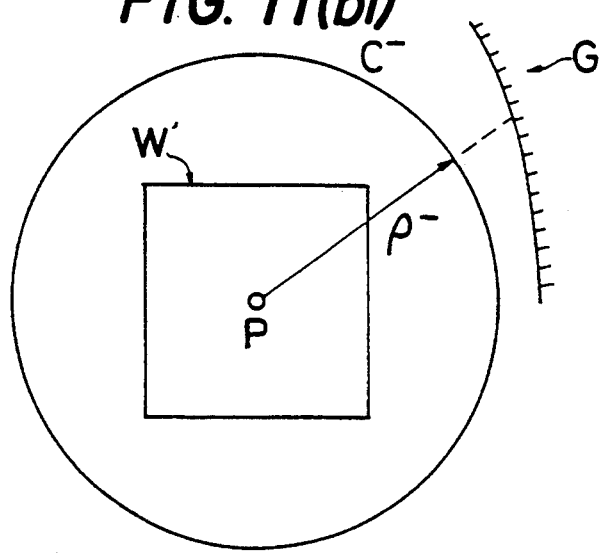
Figure 11:
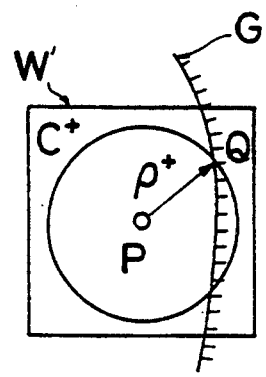
Figure 12:
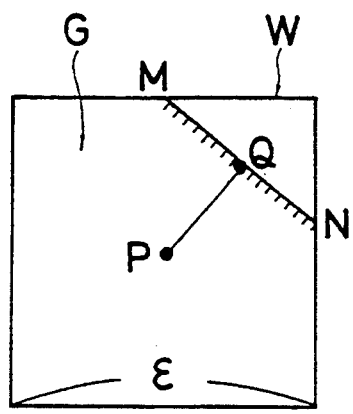
Figure 12:
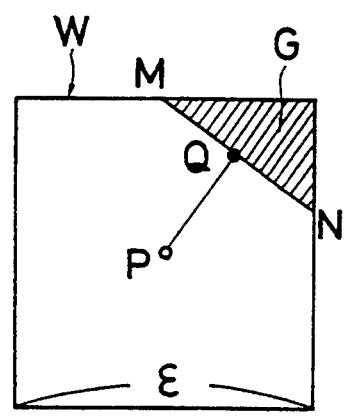

FIG. 1 is a block diagram showing the arrangement of a pattern processing apparatus for carrying out the method according to one embodiment of the present invention, and FIGS. 2 to 12 are views employed to explain the pattern processing method according to the present invention, in which: FIG. 2 is a view for explaining relative positional data; FIG. 3 is a view for explaining an operation of defining a basic region; FIG. 4 is a view for explaining an inverting operation; FIG. 5 is a view for explaining a sum operation; FIG. 6 is a view for explaining a movement operation; FIG. 7 is a view for explaining an affine transformation; FIG. 8 is a view for explaining a reflection transformation; FIG. 9 is a view for explaining an offset operation; FIG. 10 is a view for explaining a filleting operation; FIG. 11 is a view for explaining a method of expressing an outline a region; and FIG. 12 is a view for explaining a method of displaying a region. Referring to FIGS. 1 to 12, the reference numeral 100 denotes a command input mechanism, 110 a basic region defining command processing mechanism, 120 a processing and editing command processing mechanism, 130 an application command processing mechanism, and 140 a display/output mechanism, while the reference symbol G denotes the name of a region, P a point in a space, Q a point which is at the shortest distance from the point P, and W a window. Further, $\rho$, $\rho^-$, $\rho^+$ respectively denote the shortest distance from the point P to the boundary of the region G, the lower bound thereof, and the upper bound thereof.

First, a first embodiment of the pattern processing method according to the present invention will be explained with reference to FIGS. 2 to 12.

When a region is in an n-dimensional space (n=2), that is, in a two-dimensional space, relative positional data of any desired point in the space with respect to said region may be expressed by the use of various quantities shown in FIG. 2 as follows.

Figure 2A:
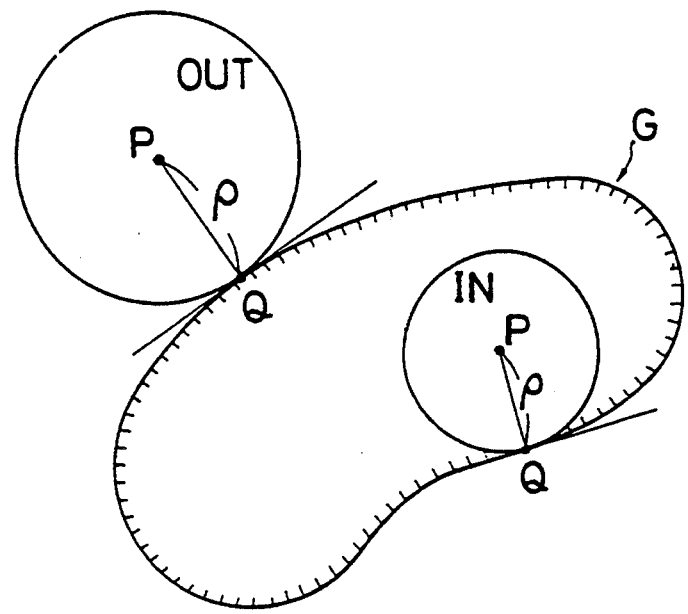
FIGS. 2(a) and 2(b) are views explaining relative positional data.

Namely, in FIG. 2(a), one of inside/outside judging data is defined as a quantity which shows whether any desired point P in the space is inside or outside a region G. The inside/outside judging data has a value IN when the point P is inside the region G and a value OUT when the point P is outside the region G. Next, the shortest distance $\rho$ from the point P to the region G is determined, together with the position of a point Q on the boundary of the region G which is at the shortest distance from the point P. The set of these data is defined as relatively expressed data with respect to the region G. The data is herein referred to as "first-class relative positional data" and expressed as follows:

(inside/outside judging data, shortest distance $\rho$, shortest distance point Q on G)  (1)

Figure 2B:
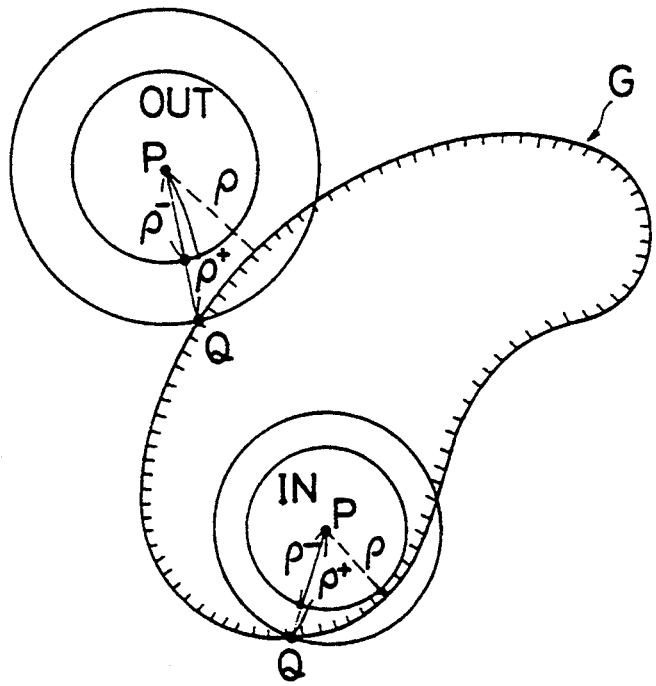

The above-described format of expression of first-class relative positional data is available when the shortest distance $\rho$ between the point P and the region G can be obtained. When $\rho$ cannot be determined, however, the first-class relative positional data may be expressed in another format. In this case, as shown in FIG. 2(b), two data, that is, the lower bound $\rho^-$ of the shortest distance and the upper bound $\rho^+$ of the shortest distance are employed in place of the shortest distance $\rho$. Further, the point Q is assumed to be a point on the boundary of the region Q which gives the upper bound $\rho^+$ of the distance from the point P and the point Q is, therefore, assumed to be a point which satisfies the following condition:

the intersection of the straight line PQ and the boundary of the region G(PQ∩G)={Q}

The relative positional data prepared in this way is referred to as "second-class relative positional data". The second-class relative positional data is expressed in the following format:

(inside/outside judging data, shortest distance lower bound $\rho^-$, shortest distance upper bound $\rho^+$, point G on the boundary of region G which is at the distance $\rho^+$ from P)  (2)

Although in the foregoing the first-class relative positional data and the second-class relative positional data have been described, the first-class relative positional data may be included in the second-class relative positional data if it is assumed that shortest distance Lower bound $\rho^-$=shortest distance upper bound p+=shortest distance $\rho$ in the second-class relative positional data. Accordingly, although both the first- and second-class relative positional data are employed as relative positional data in the following embodiments of the present invention, it is assumed that the format of the second-class relative positional data is employed for both of them.

The following is a description of means for providing relative expression procedures for various kinds of region:

(1) Means for providing relative expression procedures based on a series of data determining basic regions:

It is assumed that regions which are objects of consideration herein are those having simple configurations, including a point as being a 0-dimensional region, a straight line as being a one-dimensional region, a circle and a square as being a two-dimensional region (i.e., a region surrounded with a circle or a square), a triangle, a disk, etc. These regions will be referred to as "basic regions".

FIGS. 3(a) and 3(b) are views for explaining one example of a relative expression procedure arranged with regard to a disk region.

In this case, data determining the region are the center O and radius r of the disk. FIG. 3(a) shows that, when the point P is inside (IN) the disk, the shortest distance point Q is on the extension of the line segment OP, whereas, when the point P is outside (OUT) the disk, the shortest distance point Q is on the line segment OP.

The procedure 300 for relative expression of a disk can be attained by carrying out Steps 310 to 370, as shown in FIG. 3(b).

(i) When the center O and radius r of the disk are given, the shortest distance $\rho$ is obtained as being the shortest distance $\rho=$the length $\overrightarrow{OP}$ of OP—the radius r (Step 310).

(ii) The sign of the obtained $\rho$ is judged, and if $\rho>0$, the inside/outside judging data is decided to be OUT. If $\rho\leq 0$, the inside/outside judging data is decided to be IN, and the shortest distance $\rho$ is changed to $-\rho$ (Steps 320, 330 and 340).

(iii) The values for both the shortest distance upper and lower bounds $\rho^+$ and $\rho^-$ are determined to be $\rho$ (Step 350).

(iv) The boundary point Q is obtained as being the boundary point $Q=r\times \overrightarrow{OP}/\overrightarrow{OP}$ (Step 360).

(v) Thus, data for the relative expression procedure with respect to the disk region are obtained, and the second-class relative positional data is determined to be (inside/outside judging data, $\rho^-$, $\rho^+$, Q) (Step 370).

The relative positional data determined in Step 370 in the above-described procedure can be delivered for other use.

It is assumed here that, for the convenience later use, the reference format of the relative expression means with respect to a basic region is determined as follows:

(name of defining function, data determining a region) (3)

In the above, the name of defining function indicates one of the relative expression procedures which are different from each other in accordance with the kind of basic regions. It is assumed that the name of defining function has relative positional data as being a value when a point P is given. It is assumed that the data concerning the point P itself is not included in the reference format for the purpose of simplification. For example, the reference format of the relative expression procedure for the above-described disk is expressed as follows:

(disk, center O, radius r) (4)

Further, the relative expression procedure is given a name, and in order to enable the procedure name to be identified with the region name, the following equality is prepared in advance:

Procedure name: = (defining function name, data determining a region)  (5)
 = (region name)

For example, it is assumed that, if the equality is as follows:

G:=(disk, center O, radius r) (4)

then it may be interpreted in either of the two ways, that is, as the name of the relative expression procedure for the disk whose center is O and whose radius is r is G, or as the name of a disk region whose center is O and whose radius is r is G.

(2) Means for generating a relative expression procedure for a new region obtained from one or more boundary-expressed regions by processing and editing the region or the regions, from the relative expression procedure (s) for the one or more boundary-expressed regions:

In this case also, a reference format and an equality which are similar to the above-described expressions (3) and (5) are prepared in advance. More specifically, the reference format and the equality may be shown by the following expressions (6) and (7), respectively:

(operation function name, operation data, list of
relative expression procedure data procedure
name) (6)

$$\left.\begin{array}{l}\text{procedure name}\\ \text{(region name)}\end{array}\right\}:= \text{(operation function name,} \quad (7)\\ \text{operation data, list of relative}\\ \text{expression means or procedure names)}$$

Operation function names are different from each other in accordance with the kind of operations and each operation function name indicates a relative expression means for a new region generated by processing and editing a region or regions given on the basis of each individual operation data. The operation function name has first- or second-class relative expression data as being a value therefor. Operations will be described below more specifically.

(a) Operation of inverting a region

Reference format: (inversion, procedure or procedure name)

The term "procedure" will hereinafter be employed to mean relative expression procedure unless otherwise specified.

The inverting operation is conducted to produce a new region by inverting the relationship between the inside and outside of a region which has already been boundary-expressed. FIGS. 4(a) and 4(b) show that there is no change in the values of the relative positional data of the inverted (G) obtained by inverting a disk G whose radius is r with respect to the point P except that the inside/outside judging data is inverted. FIG. 4(c) shows that the relative expression means (400) for (inversion, G) can be obtained by carrying out Steps 410 to 430. More specifically, the inside/outside judging data in the relative expression procedure (inside/outside judging data, $\rho^-, \rho^+$, Q) for the region Q before inversion is inverted from OUT to IN or vice versa to generate relative positional data (inside/outside judging data, $\rho^-, \rho^+$, Q), which is employed as a relative expression procedure for (inversion, G) (Steps 410 to 430).

(b) Set sum of two regions

Reference format: (sum, procedure 1, procedure 2)

The sum operation is an operation of generating a new region by a set sum of a plurality of regions. FIG. 5 shows (sum, $G_1, G_2$), the elements of the set being two regions, that is, a disk $G_1$ and a square $G_2$. Subscripts 1 and 2 added to the reference symbols $\rho, \rho^-, \rho^+$, Q, etc. in FIG. 5 mean relative positional data with respect to the point P in the regions $G_1$ and $G_2$, respectively. The numerals 1, 1, 2, 2 denote the inside and outside of the regions $G_1$ and $G_2$, respectively.

Figure 5A:
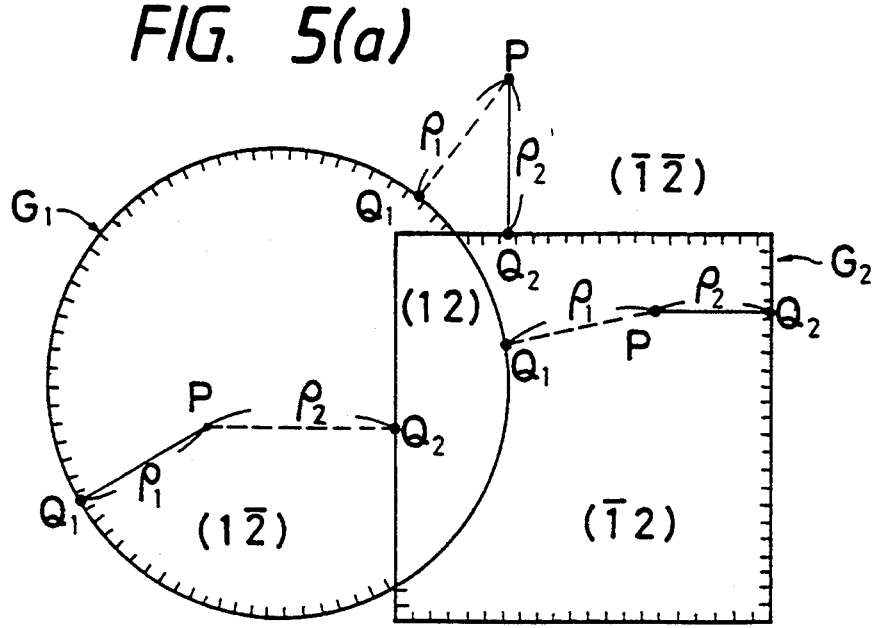
FIGS. 5(a) to 5(c) are views for explaining a sum operation.
Figure 5B:
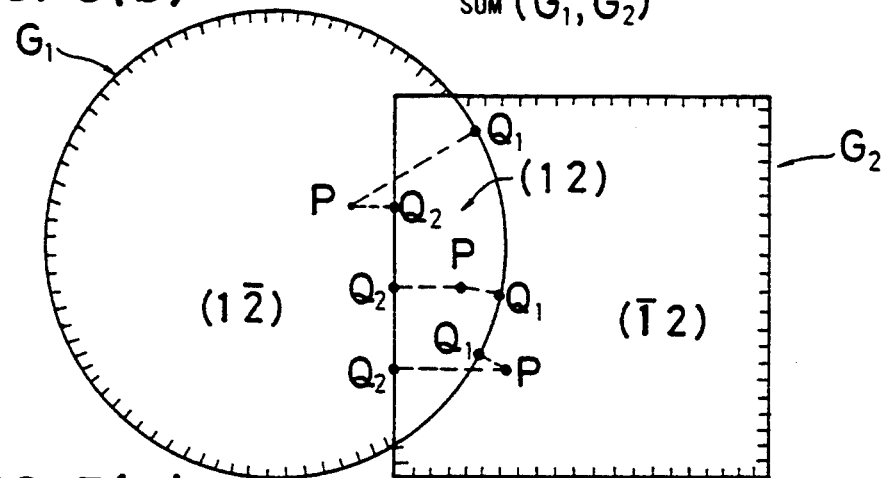
Figure 5C:
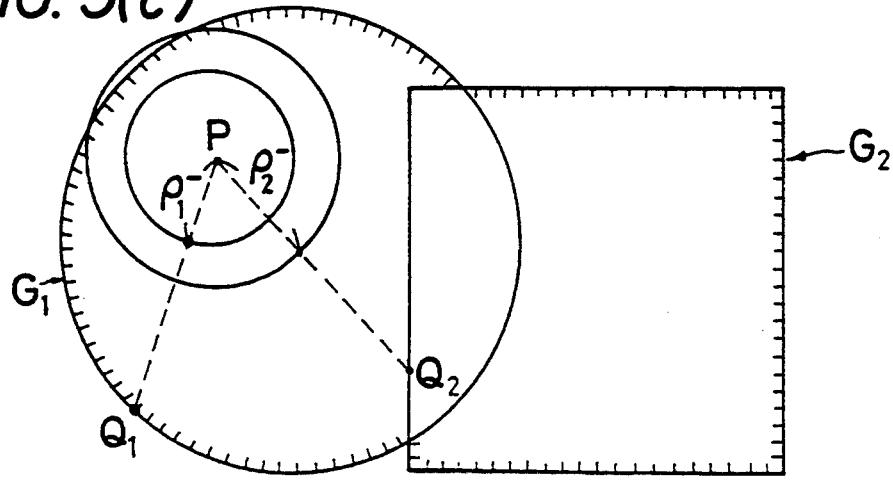

FIGS. 5(a) and 5(b) show the case where first-class relative positional data is available for both the regions $G_1$ and $G_2$, while FIG. 5(c) shows the case where both or either one of the regions $G_1$ and $G_2$ gives second-class relative positional data.

Referring first to FIG. 5(a), when the point P is in the space $(\overline{1}\,\overline{2})$, (sum, $G_1, G_2$) is obtained in the form of first-class relative positional data, and if $\rho_1 < \rho_2$, the value on the region $(G_1)$ side is taken as the value for the shortest distance $\rho$, whereas, if $\rho_1 > \rho_2$, the value on the region $(G_2)$ side is taken as the value for the shortest distance $\rho$. More specifically, in this case, either one of the values $\rho_1$ and $\rho_2$ which is smaller than the other is taken as the value for the shortest distance $\rho$. When the point P is in the space $(1\,\overline{2})$ or the space $(\overline{1}\,2)$ and $Q_1$ and $Q_2$ are outside the $G_2$ and $G_1$, respectively, that is, when $Q_1$ and $Q_2$ are in the spaces $(\overline{2})$ and $(\overline{1})$, respectively, as shown in FIG. 5(a), (sum, $G_1, G_2$) is also obtained in the form of first-class relative positional data and each of the data on the $G_1$ side and on the $G_2$ side is taken as the value for the shortest distance $\rho$. When both the regions $G_1$ and $G_2$ give first-class relative positional data but the points P, $Q_1$ and $Q_2$ are related to each other as shown in FIG. 5(b), or when at least either one of the regions $G_1$ and $G_2$ is given in the form of second-class relative positional data, that is, when the relation is such as that shown in FIG. 5(c), (sum, $G_1, G_2$) is given the following data as being relative positional data:

{inside/outside judging data, $\min(\rho_1^-, \rho_2^-)$, $\alpha$, NiL}

Here, NiL indicates that no point Q corresponding to the point P can be specified on the boundary of the region sum ($G_1, G_2$). In this case, the shortest distance lower bound $\rho^-$ for second-class relative positional data can be determined, but no upper bound $\rho^+$ can be determined. Therefore, it is decided that the data has an infinite value ($\alpha$).

(c) Set product and set difference of two regions

Reference format: (product, procedure 1, procedure 2) (difference, procedure 1, procedure 2)

The operations for set product and set difference are conducted to form regions which are respectively obtained from a region common to two regions and a result of subtraction of a region expressed by the procedure 2 from a region expressed by the procedure 1. These operations may be arranged by the use of the operations for inversion and set sum as follows:

(product, procedure 1, procedure 2):={inversion
[sum (inversion procedure 1) (inversion procedure
2)]} (difference, procedure 1, procedure
2):={inversion (sum (inversion procedure 1)
procedure 2]}

Each equality:=means that the left- and right-hand sides are equivalent to each other, and it is the same as those which have already been used.

(d) Operation for movement of a region

Reference format: (movement generating curve L procedure)

The operation for movement is conducted to define a region formed by sweeping in a space when a region which has previously been expressed by one procedure moves along a generating curve L. It is assumed that the generating curve L is a straight line, a circular arc or a combination thereof and is expressed as follows:

$$\{L(t): 0 \leq t \leq 1\}$$

The movement along the generating curve L is assumed to be such a movement that one reference point in a region as being an original region moves along the generating curve L from L(0) to L(1) together with the region. It should be noted that, although no coordinate system that is fixed on the region with the reference point being taken as an origin is clearly mentioned in the reference format, it is possible to select two coordinate systems, that is, one which rotates along the generating curve L and another which is always parallel to a generating coordinate system (referred to as "world coordinate system") whose space has been defined.

FIG. 6 shows a movement operation in which a region G moves along a circular arc L as being a generating curve while rotating the coordinate system along the generating curve L with respect to a reference point O. In FIG. 6(a), 0(0), x(0) and y(0) show a coordinate system of the region G when t=0, whereas O(1), x(1) and y(1) show a coordinate system of the region G when t=1. Relative positional data of the point P with respect to a region G* generated by the movement operation can be obtained by fixing the region G in the condition of t=1 and examining the positional relationship between a circular arc LP generated by moving the point P from P(0) to P(1) in reverse to the movement of the region G and the fixed region G. More specifically, for example, if the circular arc LP does not intersect the region G, the point P is outside the region G* and the shortest distance between the point P and the region G* is the shortest distance between the curve LP and the region G. It is assumed that in the example shown in FIG. 6 a means is adopted wherein LP is dichotomously divided into segments and second-class relative positional data is generated during this process.

FIGS. 6(b) and 6(c) show principles whereby the above-described means is made possible. Namely, one of them applies in the case where the point P(t₀) at which the circular arc LP is divided is judged to be inside the region G, as shown in FIG. 6(b). In this case, the point P is inside the region G* and the shortest distance lower bound $\rho^-$ of the point P with respect to the region G is defined as the shortest distance lower bound of the point P with respect to the region G*, thus the processing being completed. The other principle applies in the case where the circular arc LP does not intersect the region G. In this case, the point P is outside the region G*, as has already been pointed out above. FIG. 6(c) shows that a segment which is determined by two division points P(t₁) and P(t₂) is included in a circle which is centered at the middle point T of a line segment terminating at the points P(t₁) and P(t₂) and which has a diameter equal to the length of the line segment, i.e., 2r. If the circle is smaller than the lower bound $\rho^-$ of the middle point T of the line segment with respect to the region G, the shortest distance lower bound with respect to the region G may, just for this segment, be as follows:

Lower bound $\rho^-$ of point T−r>0

Accordingly, in either case the division operation is completed by conducting it a finite number of times and it is possible to obtain relative positional data for a new region generated by the movement of the region.

(e) Affine transformation of a region

Reference format: (affine transformation matrix procedure)

Affine transformation is an operation in which a region which has previously been expressed by a procedure is transformed by affine transformation to thereby generate a new region. FIG. 7 shows an operation in which a disk region G is transformed by the action of affine matrices M and M⁻ to generate a region G*. The affine matrices M and M are assumed to be those shown below:

$$M = \begin{pmatrix} a & 0 \\ 0 & b \end{pmatrix}, M^- = \begin{pmatrix} 1/a & 0 \\ 0 & 1/b \end{pmatrix}$$

Before relative positional data for a new region G* is obtained, relative positional data ($\rho^-$, Q, etc.) of not the point P but the point P·M⁻ with respect to the region G is obtained. By affine transformation effected with the transformation matrix M, the region G, the point P·M⁻, the point Q and the circle C are transformed into a region G*, a point P, a point Q' and an ellipse C', respectively, as shown in FIG. 7(b). Assuming that b<a, there is no possibility of the radius b·$\rho^-$ about the point P intersecting the boundary of the region G*. With these relationships, relative positional data of the point P with respect to the region G* may be expressed as follows:

(inside/outside judging data of P·M⁻ with respect to region G, $\rho^-$·b, length of line segment PQ', Point Q')

(f) Reflection transformation of a region

Reference format: (mirror center O radius R procedure)

Reflection transformation is an operation in which a region which has already been expressed by a procedure is transformed by reflection transformation with regard to a circle whose center is O and whose radius is R to generate a new region. It is known that a circle or a straight line is transformed into a circle or a straight line, respectively, by means of a circular mirror surface. FIG. 8 shows an operation in which a region G is subjected to reflection transformation by means of a circular mirror surface whose center is O and whose radius is R to generate a new region G* In this transformation, the method of obtaining relative positional data of the region G* with respect to the point P is the same as in the case of the above-described affine transformation. More specifically, first, relative positional data (shortest distance lower bound $\rho^-$, point Q, etc.) of the region G with respect to the reflection point $(R/|P|)^2 \cdot p$ is obtained. The circle MN which is centered at the reflection point of the point P and which has a radius $\rho^-$ is transformed into a circle M'N' centered at the point T by reflection transformation. However, the center T of the circle M'M' is not coincident with the point P. There is no possibility that the inside of a circle which is centered at the point P and which has a radius equal to the length (=r) of the line segment PN' will have a common point with the boundary of the region G*. Further, if the reflection point of the point Q is Q', the line segment PQ' has no common point with the boundary of the region G* other than the point Q'. After all, the relative positional data of the point P With respect to the region G* is expressed as follows:

(inside/outside judging data of reflection point of point P with respect to region G, r, length of line segment PQ', point Q')

(g) offsetting of a region

Reference format: (offset offset quantity δ procedure)

Offsetting is an operation in which a region which has already been expreseed by a procedure moved by an offset quantity δ(>0) to the outside of the region to thereby generate a new region. FIG. 9(a) shows an example in which the boundary of a region G is offset by δ by an offset operation to generate a new region G. Relative positional data of the region G* with respect to a point P are constructed as follows. First, relative positional data ($\rho$, Q, etc.) of the point P with respect to G is obtained. If the relative positional data is given in the form of first-class relative positional data, the relative positional data of the point P with respect to the region G* can be obtained in the form of first-class relative positional data. More specifically, the relative positional data is as follows:

(i) when the point P is outside the region G and $\rho > \delta$, (OUT, $\rho-\delta$, $\rho-\delta$, point Q' on line segment PQ and at distance $\rho-\delta$ from point P)

(ii) when the point P is outside the region G and $\rho \leq \delta$, (IN, $\delta-\rho$, $\delta-\rho$, point Q' on extension of line segment QP and at distance δ from point Q)

(iii) when the point P is inside the region G, (IN, $\rho+\delta$, $\rho+\delta$, the point Q' on extension of line segment PQ and at distance δ from the point Q)

When the relative positional data of the point P with respect to the region G is given in the form of second-class relative positional data, the relative positional data of the point P with respect to the region G* can be obtained in the form of second-class relative positional data as follows:

(iv) when the point P is outside the region G and the shortest distance lower bound $\rho^- > \delta$, (OUT, $\rho^- - \delta, \rho^+ - \delta$, NiL)

(v) when the point P is inside the region G, (IN, $\rho^- + \delta, \rho^+ + \delta$, NiL)

In the above, if the relative positional data of the point P with respect to the region G is given in the form of second-class relative positional data, another calculating means is needed in cases other than the above-described ones (iv) and (v).

FIGS. 9(b1) to 9(b4) show a method therefor. This method is for obtaining a relative position in the case where a point P is outside a region G and $\rho^- < \delta$. First, since the point P is outside the region G, a square window one side of which is $4\delta$ is set and it is then judged whether or not this window intersects the region G. If they intersect each other the shortest distance with respect to the point P is estimated while the window is recurrently divided into four by two straight lines which pass through the center of the window and which are parallel to the sides of the window, thereby calculating relative positional data. FIGS. 9(b1) to 9(b4) exemplarily show the procedures of the method, in which the white circles represent points which are outside the region G, while the black circles represent points which are inside the region G. Further, the suffixed reference symbols $P_i$ and $\rho_i^-$, such as $P_1, P_2 \ldots$ and $\rho_1^-, \rho_2^- \ldots$ means that, among relative positional data of the center $P_i$ of each of the small windows subsidived with respect to the region G, the shortest distance lower bound is $\rho_i^-$.

A square window W which is centered at a point p and each side of which is $4\delta$, shown in FIG. 9(b1), is subsidived about the point P into four small windows $W_1$ to $W_4$ shown in FIG. 9(b2), in which the centers $P_1$, $P_3$ and $P_4$ are outside the region G, while the center $P_2$ is inside the region G. Accordingly, the shortest distance $\rho$ between the point P and the region G is estimated to be $\rho \leq \sqrt{2}\delta$ from the relationship between the points P and $P_1$. Further, since the small window $W_1$ centered at the point $P_1$ is inside a circle $C_1$ which is centered at the point $P_1$ and whose radius is $\rho_1^-$, the small window $W_1$ and the region G do not intersect each other. Accordingly, the small window $W_1$ is excluded from the group of objects of estimation. Similarly, the small windows $W_3$ and $W_4$ may also be excluded from the objects of estimation. FIG. 9(b3) shows the results of the operation wherein the small window $W_2$ that has been decided to be an object of estimation in the foregoing is further subdivided about the center $P_2$. Among the center points $P_{21}$ to $P_{24}$ of the small windows $W_{21}$ to $W_{24}$ further subdivided, the point $P_{24}$ that is the closest to the point P is inside the region G in this example; therefore, the shortest distance is re-estimated to be $\rho \leq \sqrt{2}\delta/2$. Accordingly, it will be understood that estimation conducted thereafter needs to be made with respect to the small window $W_{24}$ only. FIG. 9(b4) shows a state wherein a small window $W_{244}$ obtained after the process further proceeded is further subdivided about the center $P_{244}$. As a result of such a recurrent subdivision operation, it is possible to conclude that $\rho = \sqrt{2}\delta/2$ and the shortest distance point $Q = P_{24}$. As a result, the relative positional data of the point P with respect to the region G is obtained in the form of first-class relative positional data. Accordingly, the relative positional data of the point P with respect to the region G* is given by the above-described (i) or (ii). It should be noted that, if it is found during the recurrent subdivision operation that the window W does not intersect the region G, it is concluded that $\rho^- = 2\delta$, and the relative positional data of the point P with respect to the region G* can be obtained by the above-described (iv).

(h) Filleting of a region

Reference format: (fillet, convex rounding quantity $\delta_1$, concave rounding quantity $\delta_2$, procedure)

This is an operation in which an angular point of a convex in a region expressed by a procedure is rounded with a circle whose radius is $\delta_1$, while an angular point of a concave therein is rounded with a circle whose radius is $\delta_2$, to thereby generate a new region. This operation can be effected by the use of both inverting and offset operations and is equivalent to the following operation:

(fillet $\delta_1$ $\delta_2$ procedure):=(offset $\delta_1$ (inversion (offset $\delta_1 + \delta_2$ (inversion (offset $\delta_2$ procedure))))))

FIGS. 10(a), 10(b) and 10(c) exemplarily show the procedures of a filleting operation conducted with respect to a region 10. In FIGS. 10(a) to 10(c), 61 and 62 denote a convex rounding quantity and a concave rounding quantity, respectively, for a region G. In this case, there are the following relationships between the regions G, $G_1$, $G_2$, $G_3$ and a region G* obtained by an offset operation:

$G_1$:=(offset $\delta_2$ G)
$G_2$:=(offset $\delta_1 + \delta_2$ (inversion $G_1$))
$G_3$:=(inversion $G_2$)
$G_4$:=(offset $\delta_1$ $G_3$) i.e.,
$G^*$:=(offset $\delta_1$(inversion (offset $\delta_1 + \delta_2$ (inversion (offset $\delta_2$ G)))))

The foregoing operation will be briefly explained below with reference to FIGS. 10(a) to 10(c). First, a figure G shown in FIG. 10(a) is offset by $\delta_2$ corresponding to the concave rounding quantity. As a result, the figure $G_1$ is expanded outward and thus transformed into the figure $G_1$ shown in FIG. 10(b). Next, the figure $G_1$ is subjected to an inverting operation and then offset by the sum of the convex rounding quantity $\delta_1$ and the concave rounding quantity $\beta_2$, i.e., $\delta_1 + \delta_2$. As a result, the figure $G_1$ is transformed into the figure $G_2$ shown in FIG. 10(b) Since in this case the figure $G_1$ is inverted, the resulting figure $G_2$ is apparently reduced in size. Further, the figure $G_3$ is inverted and then offset by $\delta_1$ corresponding to the convex rounding quantity. Thus, it is possible to obtain a final target figure G* such as that shown in FIG. 10(c).

(3) Means for expressing configurational characteristics of a relatively expressed region itself by the use of the relative expression procedure of the region:

(a) Expression of an outline of a configuration by subdivision of a space

A region that is relatively expressed is difficult to recognize as a configuration in this state and therefore necessary to express in the form of a configuration. Accordingly, the present invention provides a means for expressing an outline of the region by subdividing a space including the region by the use of the relative expression procedure of said region. The expression means will be explained with reference to FIG. 11.

Referring first to FIG. 11(a), a square window W which includes a region G and each side of which is H is set. The operation of subdividing the window W is conducted by a method wherein the window W is subdivided into four small square windows by two straight lines which pass through the center of the window W and which are parallel to the axes x and y, respectively. After the subdivision, each of the small windows is given a flag (full), (empty) or (half-empty) according to whether the window is included in the region G, the window and the region G do not intersect each other, or the positional relationship between the window and the region G is any other than said two. Each small window that is given the flag (half-empty) is further subdivided in the same way as the above, and the small windows thus obtained are given flags similar to those described above.

The subdivision and assignment of flags are recurrently repeated. The subdivision is completed when the length of each side of all small windows given the flag (half-empty) is within the demanded tolerances $\epsilon$. The small windows given the flag (half-empty) define in combination the boundary of the region. Data concerning each small window with a flag thus generated is stored in memory in the form of a quadtree in accordance with the process of the subdivision. Criteria on the basis of which each small window is given a flag, which are the key of this method, will be explained below with reference to FIGS. 11(b) and 11(c).

The relative positional data of the center point of a small window W' with respect to a region G is assumed to be (inside/outside judging data, $\rho^-$, $\rho^+$, Q), and criteria are set as follows:

Criterion 1: when a circle $C^-$ centered at the point P and whose radius is $\rho^-$ includes the window W', the flag (full) or (empty) is set according whether the inside/outside judging data is IN or OUT [FIG. 11(b)].

Criterion 2: when a circle $C^+$ centered at the point P and whose radius is $\rho^+$ is included in the window W', the flag (semi-empty) is given to the window W'[FIG. 11(c)].

If neither of the above-described criteria can be applied to a small window, it may be regarded as (half-empty) and the subdivision is continued.

(b) Derivation of mass properties (area, center of gravity, secondary moment about center of gravity) of a region Mass properties, which are characteristic quantities of a region, can be obtained by the above-described method (a). More specifically, mass properties can be obtained by a method wherein various quantities are calculated with regard to windows given the flag (full) or (half-empty) by scanning the stored quadtree data of the region and the calculated quantities are totaled. It should be noted that windows given the flag (half-empty) may be handled by any desired one of various methods, for example, they may be regarded as (full) or may be probabilistically regarded as (full) or (empty) by the use of random numbers.

(c) Display of a region

There are two methods of displaying the configuration of a region. In either case, display of the configuration of a region can be attained carrying out the following processing with respect to windows given the flag (half-empty) while scanning a quadtree based on quadtree data for expression an outline by the subdivision of a space described in the foregoing (a). The processing will be described hereinunder with reference to FIG. 12.

Display method 1

Referring to FIGS. 12 (a1) and 12 (a2), a shortest distance point Q is obtained from the relative positional data of the center point P of a window W each side of which is $\epsilon$ with respect to a region G, and a straight line which passes through Q and which is perpendicular to the line segment PQ is cut off by the window W to define a line segment MN, which is then displayed.

Display method 2

Figure 12B:
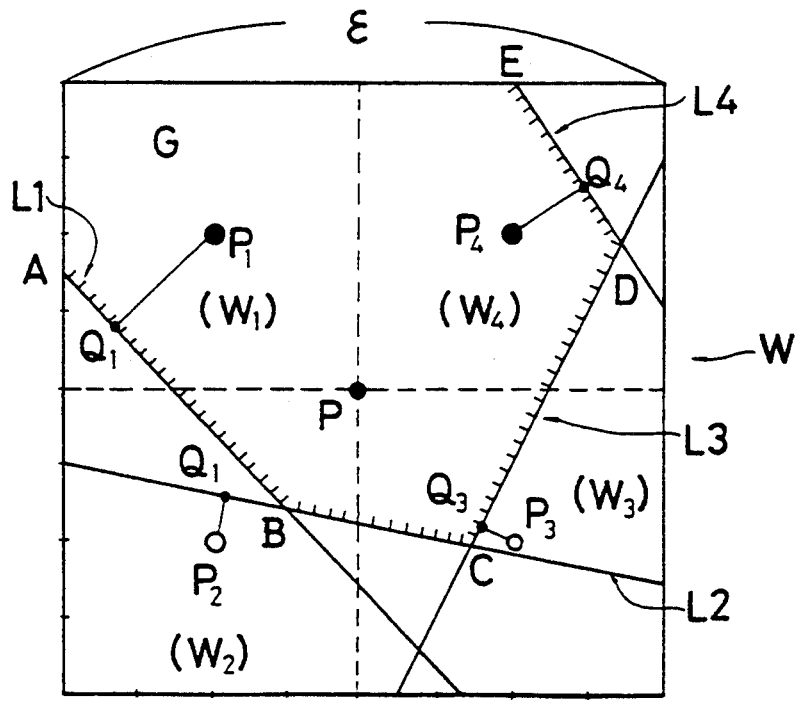

As shown in FIG. 12(b), a window W is subdivided into four small windows $W_1$ to $W_4$ by two straight lines which pass through the center point P and which are parallel to the sides of the window W. Next, with regard to the center point $P_i$ of each small window $W_i$ (i=1 to 4) a shortest distance point $Q_i$ is obtained from the relative positional data of the point $P_i$ with respect to a region G. With regard to the point $Q_i$ included in each small window $W_i$, a straight line which passes through the point $Q_i$ and which its perpendicular to the line segment $P_iQ_i$ is cut off by the window W to generate a line segment $L_i$. Next, the condition of intersection between the line segments $L_i$ (i=1 to 4) is examined, and the polygonal line ABCDE on the side where the region G is included is displayed.

In the foregoing description, if the shortest distance point Q (or the point $Q_i$) of the point P (or the point $P_i$) to the region G is given in the form of first-class relative positional data of the point P (or the point $P_i$) with respect to the region G, the shortest distance point Q (or $Q_i$) is included in the data; if not, in the case of the display method 1, the method employed in the above-described operation of offsetting a region and shown in FIGS. 9(b1) 9(b4) is applied to a window W each side of which is $\epsilon$, whereas, in the case of the display method said method is applied to a window $W_i$ each side of which is $\epsilon/2$.

The present invention facilitates the generation of pictures and the like in machine design, structure design, parts design or computer graphics by employing the above-described means (1) to (3), that is, conducting the operation of defining the configuration of a basic region, the movement operation, transformation of a region by the permutation operation, the set operation, expression of characteristics of the region configuration, display, etc.

Embodiment 2

The second embodiment of the present invention enables an outline of a boundary-expressed region to be expressed in more detail wholly or partially the basis of the method of expressing an outline of a region described in the section (3)-(a) in the foregoing first embodiment and by stepwisely reducing the tolerances $\epsilon$. In this case, since the configuration of a region can be strictly described by the boundary expression procedure that is employed as a basic procedure, there is no restriction on the level expressing an outline in detail. According to this method, it is possible to calculate characteristic quantities concerning each region and make a judgement of interference between regions with a degree of precision required for each particular purpose. In addition, it is possible to further dynamically increase the degree of precision on the basis of the results at a certain degree of precision.

Accordingly, the second embodiment is effectively used in planning made in the upper course of designing, designing, machining simulation in NC machining, layout of a device, assembly and disassembly of a device, simulation of carrying in and installation of plant members, etc.

Embodiment 3

The third embodiment of the present invention realizes the method described in the foregoing first and second embodiments in the form of an apparatus.

FIG. 1 is a block diagram showing the arrangement of the pattern processing apparatuses.

The pattern processing apparatus for carrying out the present invention comprises, as shown in FIG. 1 a command input mechanism 100, a basic region defining command processing mechanism 110, a processing and editing command processing mechanism 120, an application command processing mechanism 130 and display/output mechanism 140. The command input mechanism 100 is a means for effecting relative expression of a region and realizing general control functions including a function of indication by the use of reference formats and the symbol:=and a function of dynamically controlling the tolerances $\epsilon$ for expressing an outline of a region in the second embodiment. The basic region defining command processing mechanism 110 generates relative expression procedures for basic regions described in the section (1) in the first embodiment and is arranged so that it can be stepped up in building block manner For each individual defining function concerning each particular basic region. The processing and editing command processing mechanism 120 realizes in the form of a mechanism the function described in the section (2) in the first embodiment. This mechanism can be stepped up in building block manner for each operation function. The application command processing mechanism 130 and the display/output mechanism 140 are mechanisms for executing the functions described in the section (3) in the first embodiment. The mechanism 130 is arranged so that it can be stepped up in building block manner for each application function.

Embodiment 4

The fourth embodiment of the present invention provides a pattern processing method and a pattern processing apparatus for three-dimensional regions.

The fourth embodiment of the present invention can be obtained by combining together the following methods, that is, a method wherein any of the above-described methods of the first to third embodiments of the present invention is three-dimensionally extended to thereby form a pattern processing method and a pattern processing apparatus for regions in three-dimensional spaces and another method wherein, to the relative positional data a point P in a space prepared as being fundamentals in the above-described first to third embodiments the present invention, information about a boundary surface to which the shortest distance point Q with respect to the point P belongs is added to change the relative positional data as follows:

(inside/outside judging data, shortest distance lower bound $p^-$, shortest distance upper bound point Q on region boundary and at distance $p^+$ from point P, number of surface to which point Q belongs)

In three-dimensional designing, it is general that pieces of information which are important from the viewpoint of design and manufacture, for example, the kind of surface, data determining the configuration of surface, material of surface, machining method, machining accuracy, the kind of color, etc. are held as being attributes in correspondence with the surface number. Therefore, the fourth embodiment can be continuously utilized from designing to manufacture and inspection.

Embodiment 5

The fifth embodiment of the present invention is a numerically controlled apparatus or robot which is arranged by incorporating a pattern processing apparatus obtained in the foregoing fourth embodiment, which is similar to that shown in FIG. 1, and additionally providing the command input mechanism 100 with a mechanism arranged to move the viewpoint relative to an actual three-dimensional object and measure the shortest distance between the viewpoint and the three-dimensional object by the use of a non-contact element and further additionally providing the display/output mechanism 140 with an instruction mechanism for effecting an operation in which a region in a three-dimensional space expressed by the other processing mechanisms 110 to 130 is machined, moved or assembled as being a three-dimensional object in an actual space.

The pattern processing apparatus that is incorporated in the apparatus in the fourth embodiment unitarily expresses regions in three-dimensional spaces by relative expression procedures, and relative positional data given by the procedures has formats which are natural and easy for a user or a machine to utilize for recognition of three-dimensional objects. Therefore, this embodiment enables automatic machining, automatic transportation, automatic assembly, etc. by combining together machining and measurement, movement and measurement, assembly and measurement, etc. at manufacturing sites, for example, factories. It is also possible to effect automatic inspection.

Industrial Applicability

According to the present invention, a region in an n-dimensional space is identified with a relative expression procedure for generating relative positional data of any desired point in the space with respect to the region in a fixed format and the region is expressed by means of the relative expression procedure, thereby enabling definition of the configuration of the region, processing, editing and expression of the characteristics of the resulting relatively expressed region to be unitarily effected by means of the relative expression procedures employed to express regions, that is, through relative positional data having a fixed format provided by these relative expression procedures. Therefore, it is possible to effect pattern processing which is conceptionally complete, solid and clear in comparison with the pattern processing methods according to the prior art. In addition, since the pattern processing method according to the present invention is simple in itself, it is also easy to realize the method in the form of an apparatus.

What is claimed is:

1. A pattern processing method for processing patterns for a computer-aided design system or a computer graphics system to generate patterns on a display device of the computer-aided design system or computer graphics system, wherein the pattern processing method comprises performing the following steps with regard to a region in an n-dimensional space (where n is a natural number):

(1) means for providing a relative expression procedure for generating relative positional data of any desired point P in the space with respect to said region in a fixed format by the use of a series of data determining said region, thereby identifying said region as a relatively expressed region with said procedure, and thus unitarily determining said relatively expressed region;

(2) means for generating a new relative expression procedure for a new region from the relative expression procedure(s) of one or more of said relatively expressed regions, the new relative expression procedure for the new region being obtained by configurationally processing and editing the one or more of said relatively expressed regions, thereby identifying the new region as a new relatively expressed region; and (3) means for expressing configurational characteristics of each relatively expressed region by the use of the relative expression procedure of said region.

2. A pattern processing method according to claim 1, wherein the relative positional data of any desired point P in the space with respect to the region has a data format comprising the set whose elements are inside/outside judging data indicating whether the point P is inside or outside the region, the shortest distance from the point P to the boundary of said region, and a point Q on said region which is the shortest distance on said boundary from the point P.

3. A pattern processing method according to claim 1, wherein the relative positional data of any desired point P in the space with respect to the region has a data format comprising the set whose elements are inside/outside judging data indicating whether the point P is inside or outside the region, the lower bound of the shortest distance from the point P to the boundary of said region, the upper bound of the shortest distance from the point P to the boundary of said region, and a point Q at the upper bound which is the shortest distance on said upperbound from the point P.

4. A pattern processing method according to claim 2 or 3, wherein the relative positional data of any desired point P in the space with respect to the region has a data format comprising the set including information used to identify the boundary surface to which the point Q belongs.

5. A pattern processing method according to claims 1, 2 or 3, further comprising means for obtaining the shortest distance from one point P to the boundary of said relatively expressed region and a point Q on the boundary of said region and at the shortest distance by setting an n-dimensional solid which includes the point P and in which the shortest distance from the point P to the boundary of the region is equal to or greater than the upper bound value of said shortest distance in the form of a window for search by the use of the relative positional data of the point P with respect to said region or the upper bound value of said shortest distance estimated by other means, dividing said window into a group of small windows as being a plurality of partial n-dimensionial solids according to a predetermined rule of division, judging whether the point Q is present inside each of the small windows by the use of the relative positional data of the center point of the small window with respect to said region, performing a division operation similar to the above with respect to a small window judged to be a candidate for the one in which the point Q is present, and recurrently repeating the operation of selecting a candidate for the one in which the point Q is present from the subdivided small windows.

6. A pattern processing method according to claims 1, 2 or 3, further comprising means for effecting a filleting operation for smoothly rounding an angular point on the boundary of the region using two parameters, i.e., the radius 1 and the radius 2, in such a manner that said region is first offset outward by an amount corresponding to the radius 2 and then offset inward by an amount corresponding to the sum of the radii 1 and 2 and, finally, the region thus offset is further offset outward by an amount corresponding to the radius 1.

7. A pattern processing method according to claims 1, 2 or 3, further comprising means for expressing an outline of a relatively expressed region by setting an n-dimensional solid which includes said region in the form of a window, dividing said window into a group of small windows as being a plurality of partial n-dimensional solids according to a predetermined rule or division, judging whether each of the small windows is included in said region, said small window and said region do not intersect each other, or the positional relation between said small window and said region is any other than said two, by the use of the relative positional data of one point inside said window with respect to said region, assigning each small window one of the three flags, i.e., (full), (empty) and (half-empty), in accordance with the result of the judgement, recurrently subjecting each window assigned the flag (half-empty) to division and assignment of a flag to each of the subdivided small windows in the same way as the above, finishing said operation when the radius of each window assigned the flag (half-empty) becomes equal to or less than a given value (referred to as "expression tolerances"), and structurally storing in memory all windows assigned the respective flags according to the manner of the division operation.

8. A pattern processing method according to claim 7, further comprising means for approximately expressing said region in stepwise manner from a coarse level to a fine level by dynamically controlling the expression tolerances employed in the outline expression of said region.

9. A pattern processing method according to claim 7, further comprising means for expressing in the form of a polyhedron the portions of said region which are included in the windows assigned the flag (half-empty), that is, the region boundary included in said windows, among the outline expression data for the region, by the use of the relative positional data of one or more representative points included in said windows which respect to said region.

10. A pattern processing method according to claim 9, wherein the means for expressing the region boundary in the form of a polyhedron is applied to a region in either two- or three-dimensional space, the method further comprising means for displaying said region on a display unit.

11. A pattern processing apparatus employing the pattern processing method of at least one of claims 1, 2 or 3.

12. A numerically controlled apparatus or robot incorporating the pattern processing apparatus of claim 11.

* * * * *